July 26, 1955
L. V. ABRAMS
2,713,946
FILTERS
Filed Nov. 13, 1950
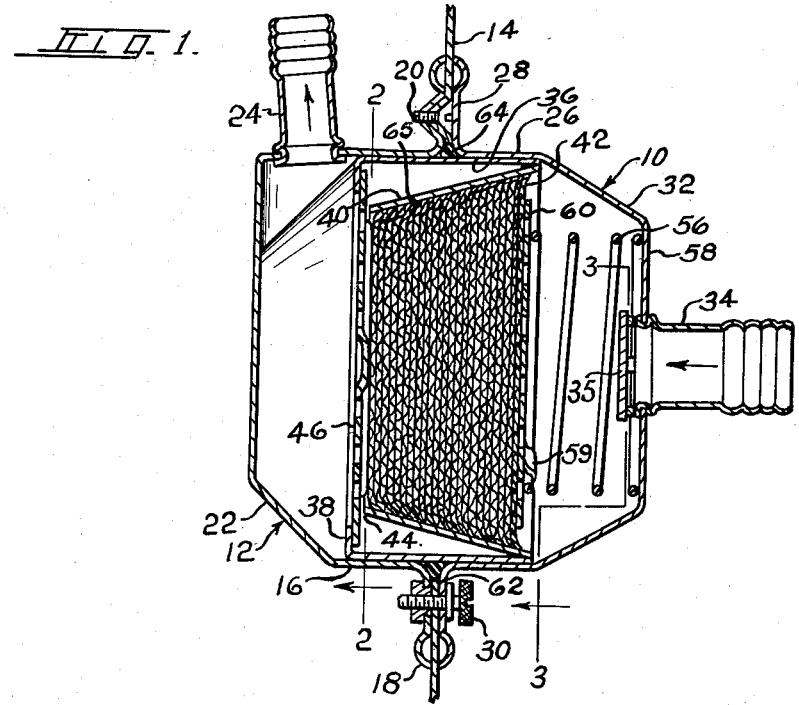
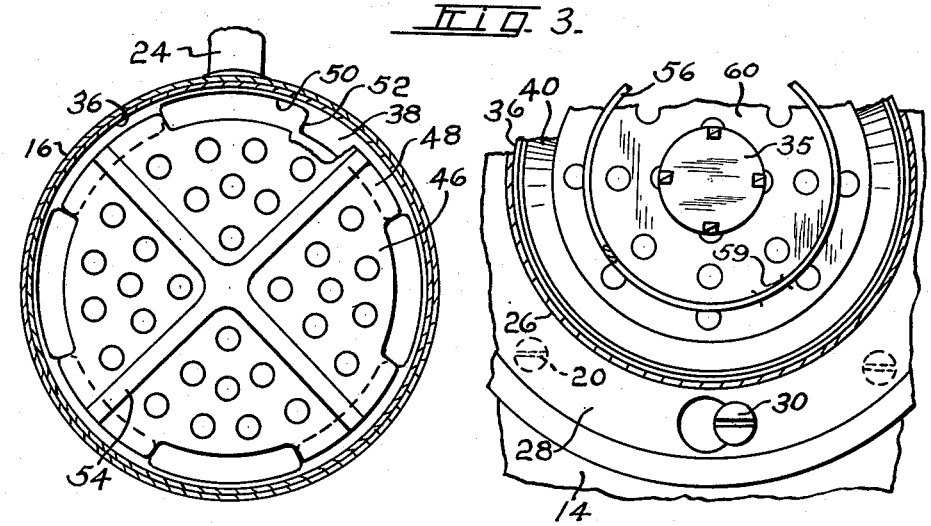
INVENTOR
LOUIS V. ABRAMS
BY *signature*
ATTORNEY United States Patent Office 2,713,946
Patented July 26, 1955

2,713,946

FILTERS

Louis V. Abrams, Chittenango, N. Y., assignor to Easy Washing Machine Corporation, Syracuse, N. Y., a corporation of Delaware Application November 13, 1950, Serial No. 195,396

5 Claims. (Cl. 210—164)

This invention relates to filters, and more particularly to a filter affording ready replacement of the filter medium and constructed to prevent fluid bypassing of the filter medium.

In an application Serial No. 72,191, filed January 22, 1949, now Patent No. 2,691,883, there is disclosed a filter in which the filter medium employed is adapted to permit relatively free passage of liquid therethrough, such filter medium being particularly adapted to afford ample opportunity for the removal from the water of such elements and impurities as have an affinity for the medium and would likely effect staining of laundry in a rinsing operation. The filter medium is composed of loosely woven material such as cheesecloth or the like, normally fabricated from cotton fibers, preferably unsized, and having the same affinity for staining impurities as the laundry to be rinsed by the water after passing through the filter. In the application referred to, the filter medium required compacting within the filter chamber to prevent bypassing of the water along the chamber walls and around the filter medium.

The present invention is directed to a filter construction in which the necessity for compacting the filter medium is substantially eliminated, and yet the bypassing is prevented. The invention is directed to a filter medium-containing chamber having a tapered wall, tapered in the direction of flow, and adapted to cooperate with a series of fabric filter disks arranged within the tapered wall portion of the chamber, in transverse relation to the direction of flow, such disks being of greater diameter than the tapered wall and thereby being adapted to cup against the tapered wall, whereby the pressure upon the cupped edges of such disks will hold such edges in contact with the tapered wall and will prevent bypass around the edges.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this puropse to the appended claims.

In the drawings, wherein like reference characters indicate like parts:

Figure 1 is a longitudinal section through a filter embodying the invention;

Figure 2 is a sectional view taken substantially on the line 2—2 of Figure 1; and Figure 3 is a section taken substantially on the broken line 3—3 of Figure 1.

Referring to the drawings, there is shown an inlet filter casing 10 and an outlet filter casing 12, mounted upon opposite sides of a supporting panel structure 14. The outlet casing 12 has a cylindrical portion 16 flanged as at 18 and secured to the panel 14 as by a series of threaded fastening means 20. The outlet end of the outlet chamber 12 may be conical as at 22, and is provided with an outlet nipple 24.

The inlet chamber 10 is provided with a cylindrical portion 26 flanged as at 28 for detachably securing the same to the panel 14 as by thumb screws 30, the inlet end of the chamber being conical as at 32 and provided with an inlet nipple 34. A distributing disk 35 may be affixed to the inner end of the nipple. The cylindrical wall 26 is provided with an annular cylindrical sleeve 36, soldered or otherwise secured to the wall 26 in leak-tight manner, but adapted to telescopically project into the cylindrical portion 16 of the outlet shell or casing 12. The outlet end of the sleeve 36 is flanged as at 38. The sleeve 36 supports an additional tapered sleeve 40 extending axially within the sleeve 36, the tapered sleeve being adapted to receive disks of fabric filter medium stacked in the manner shown as at 42. Such tapered sleeve is also soldered to the sleeve 36 in sealed relation.

The inner open end 44 of the tapered sleeve 40 terminates adjacent to the flange 38, and there is provided a removable perforate plate 46 supported upon the flange 38, the plate extending across the open outlet end of the tapered sleeve 40. For the purpose of permitting ready placement and removal of the plate 46, the peripheral edge of such plate and the flange 38 are discontinuous to provide in effect a bayonet attachment whereby the extended portions or tongues 48 of the plate may be inserted between the discontinued portions 50 of the flange 38 and the plate thereafter rotated so that the tongues 48 of the plate 46 will be supported upon the segmental portions 52 of the flange 38. Such plate 46 may be strengthened by ribbing 54 or otherwise, as may be desired.

Within the inlet chamber 10, there is provided a light coil spring 56 seated on the end 58 of the shell 10 and bearing against and secured by fingers 59 upon a perforate pressure plate 60. Between the flanges 28 and 18 of the inlet casing 10 and outlet casing 12, and within the aperture 62 in the panel 14, is positioned a resilient gasket ring 64 which is compressed into sealing relation between the flanges 18 and 28 and the cylindrical sleeve 36 when the inlet casing 10 is secured in position by the thumb screws 30.

It will be seen that the inlet casing 10, the cylindrical sleeve 36, and plate 46 are all removable as a single unit from the outlet casing 12, and that upon removal of the plate 46, the open end of the tapered sleeve 40 is accessible for the removal of or the insertion of filter medium. The present construction is particularly adapted to utilize fabric disks of loosely woven material such as terry cloth toweling or similar pile fabric. Such disks, it will be understood, will be of greater diameter than the internal diameter of the tapered sleeve 40. When it is desired to load the filter, a stack of such disks will be inserted through the open end of the tapered sleeve 40 and pressed against the pressure plate 60, compressing the spring 56. By forcing the disks inwardly of the tapered sleeve 40 toward the inlet nipple 34 beyond that point where such disks would normally repose when the plate 46 is in position, the marginal edges 65 of such disks will be permitted to expand in diameter slightly by reason of movement in the direction of the expanded tapered sleeve, and upon return movement of the disks into the position substantially shown in Figure 1, which position such disks normally take upon the insertion of the plate 46, the marginal edges 65 of such disks will be caused to curl or cup inwardly in the direction of the expanded taper. Thus, as liquid filters through such disks, any resistance to flow will result in the cupped edges of the disk being forced against the wall of the tapered sleeve 40, so that the pressure of liquid flowing through the filter will maintain the edges of such disks in contact with the surface of the tapered sleeve and prevent the passage of liquid through the filter except through the filter medium.

In the particular filter described, the inlet casing 10 with its cylindrical sleeve 36 and tapered sleeve 40, is such as to provide a chamber from which outflow may only be effected through the enlarged cross-sectional area defined by the tapered sleeve 40. Thus, with the transverse filter disks positioned in the manner described within such tapered wall, the passage of liquid except through the filter medium is prevented, and during such passage, such foreign elements as would stain the filter medium will have adequate opportunity to become entrapped or otherwise combined with the filter medium so as to be effectually removed from the fluid during its passage through the filter medium. It will be seen that should the filter medium become blocked by an accumulation of swarf, pressure will be built up within the casing 10, but such pressure will increase the engagement of the cupped edges of the filter disks upon the tapered wall, and if such pressure causes compacting of the disks, the taper will act to increase the assurance of certain contact of the filter disks with the wall. By reason of the construction, the casing 10 and sleeves 36 and 40 will be subject to the inlet pressure, and the seal 64 is only subject to such pressure as is in the outlet casing 12. Likewise, the strain upon the thumb screws 30 is restricted to such pressure as is in the outlet casing 12, so that the condition of the filter medium within the casing 10 and any back pressure resulting therefrom has no effect upon the removal of the inlet casing unit for inspection or replacement of the filter medium. When the casing 10 is removed from the outlet casing, the plate 46 may be readily loosened, turned and removed, and the filter medium quickly taken out and replaced with fresh filter disks. By forcing such disks into the tapered casing and collapsing the light spring, such disks will be caused to cup around the edges. Replacement of the plate 46 and pressure of the spring 56 and plate 60, will serve to hold the filter disks in proper position, that is transversely across the tapered sleeve, with their edges correctly cupped.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a filter, a pair of substantially symmetrical shell members each having a marginal flange and constituting inlet and outlet shell members, respectively, a compartment carried by the inlet shell member having a side wall integrally secured in sealed relation to the inlet shell member in leak-tight relationship, and a tapered wall secured to said side wall adjacent the inlet end thereof in leak-tight relationship, said tapered wall reducing in area in the direction of flow, said compartment having a perforate inside end wall within the inlet shell member of an area less than the maximum cross-section of said tapered wall, said inside end wall having a resilient support extending to said inlet shell member, and being adapted to be resiliently urged into the region defined by the tapered wall, and a removable outside perforate end wall detachably secured to said side wall by bayonet connecting means independent of said tapered wall and in close relation to the reduced area end thereof, said compartment projecting part way into the outlet shell member, a panel having an aperture to receive said compartment, having said outlet shell member secured thereto by its flange about said aperture, and detachable means for securing the inlet shell member upon said panel including a seal conjointly bearing against said flanges and compartment side wall.

2. In a filter, a pair of substantially symmetrical shell members each having a body portion and a marginal flange constituting inlet and outlet shell members, respectively, a compartment carried by the inlet shell member having a side wall integrally secured in sealed relation to the inlet shell member in leak-tight relationship, and a tapered wall secured to said side wall adjacent the inlet end thereof in leak-tight relationship, said tapered wall reducing in area in the direction of flow, said compartment having a perforate inside end wall within the inlet shell member of an area less than the maximum cross-section of said tapered wall, said inside end wall having a resilient support extending to said inlet shell member, and being adapted to be resiliently urged into the region defined by the tapered wall, and a removable outside perforate end wall detachably secured to said side wall by bayonet connecting means independent of said tapered wall and in close relation to the reduced area end thereof, said compartment projecting part way into the outlet shell member, detachable means for securing the inlet shell member flange to the outlet shell member flange, said flanges having a rounded juncture with their respective body portions whereby to provide a seal cavity bounded by the convex surfaces of the rounded junctures and compartment wall, and a seal ring conjointly bearing against the rounded junctures of said flanges and compartment side wall.

3. In a filter, a pair of substantially symmetrical shell members, each having a marginal flange, one of said shell members constituting an inlet shell member and the other an outlet shell member, a compartment carried by the inlet shell member having a side wall integrally secured to the inlet shell member in leak-tight relationship, and a tapered wall secured to said side wall adjacent the inlet end thereof in leak-tight relationship, said tapered wall reducing in area in the direction of flow, said compartment having a perforate inside end wall within the inlet shell member of an area less than the maximum cross-section of said tapered wall, said inside end wall having a resilient support extending to said inlet shell member, and being adapted to be resiliently urged into the region defined by the tapered wall, and a removable outside perforate end wall detachably secured to said side wall independent of said tapered wall and in close relation to the reduced area end thereof, said compartment projecting part way into the outlet shell member, a panel for supporting said shell members, having an aperture larger than the portion of the compartment projecting into the outlet member, said panel having secured thereto the flange of the outlet shell adjacent the marginal edge of the aperture, detachable means for securing the inlet shell member flange to said panel, and a seal located within said aperture and conjointly bearing against said flanges and compartment side wall.

4. In a filter, a pair of substantially symmetrical shell members, each having a body portion and a marginal flange, one of said shell members constituting an inlet shell member and the other an outlet shell member, a compartment carried by the inlet shell member having a side wall integrally secured to the inlet shell member in leak-tight relationship, and a tapered wall secured to said side wall adjacent the inlet end thereof in leak-tight relationship, said tapered wall reducing in area in the direction of flow, said compartment having a perforate inside end wall within the inlet shell member of an area less than the maximum cross-section of said tapered wall, said inside end wall having a resilient support extending to said inlet shell member, and being adapted to be resiliently urged into the region defined by the tapered wall, and a removable outside perforate end wall detachably secured to said side wall, independent of said tapered wall and in close relation to the reduced area end thereof, said compartment projecting part way into the outlet shell member, detachable means for securing the inlet shell member flange to said outlet shell flange, said flanges having a rounded juncture with their respective body portions whereby to provide a seal cavity bounded by the convex surfaces of the rounded junctures and compartment wall, and a seal ring located within said detachable means conjointly bearing against the rounded junctures of said flanges and compartment side wall.

5. In a filter, an inlet casing unit having an annular internal tapered wall, said wall defining a chamber of substantial cross-sectional area transverse of the direction of flow therethrough, said wall being tapered to reduce the cross-sectional area in the direction of flow and being open at its reduced area end for the insertion of a stack of relatively thin flexible filter media laminae each having an area greater than the cross-sectional area within said tapered wall, removable rigid perforate plate means immediately adjacent the open end of said tapered wall, said plate means being larger than the reduced area end of said tapered wall, means to support said plate entirely from said inlet casing unit, said plate means being adapted to support a stack of said filter media within said tapered wall area, a stack of thin flexible filter disks of an area at least as great as the maximum cross-sectional area of said tapered wall, and of a thickness less than the depth of said tapered wall, resilient compression means mounted within said chamber and adapted to lightly press on said stack of filter media toward said plate means, and an outlet chamber adapted to receive said inlet casing unit and enclose said plate means and the reduced area open end of said tapered wall, said inlet casing unit being removable as a unit from said outlet chamber, whereby said disks have their marginal edges cupped against said tapered wall in a direction opposite to the direction of flow.

References Cited in the file of this patent

UNITED STATES PATENTS

| | | | |
|---|---|---|---|
| 183,599 | Sinclaire | Oct. 24, | 1876 |
| 773,946 | Langill | Nov. 1, | 1904 |
| 929,717 | Self | Aug. 3, | 1909 |
| 1,035,653 | Stubbe | Aug. 13, | 1912 |
| 1,396,685 | Houck | Nov. 8, | 1921 |
| 1,456,883 | Deeks | May 29, | 1923 |
| 1,830,664 | Kracklauer | Nov. 3, | 1931 |
| 1,920,268 | Moriya | Aug. 1, | 1933 |
| 2,098,102 | McLean | Nov. 2, | 1937 |
| 2,174,769 | White | Oct. 3, | 1939 |
| 2,606,662 | Dyer | Aug. 12, | 1952 |

FOREIGN PATENTS

| | | | |
|---|---|---|---|
| 141,624 | Great Britain | Oct. 25, | 1919 |
| 230,991 | Great Britain | Mar. 26, | 1925 |
| 883,301 | France | July 1, | 1943 |